United States Patent [19]

Ohara

[11] Patent Number: 4,812,999
[45] Date of Patent: Mar. 14, 1989

[54] DATA OUTPUT CONTROL SYSTEM
[75] Inventor: Sinji Ohara, Tokyo, Japan
[73] Assignee: NEC Corporation, Tokyo, Japan
[21] Appl. No.: 20,330
[22] Filed: Feb. 27, 1987
[30] Foreign Application Priority Data
　Feb. 28, 1986 [JP]　Japan .................................. 61-43396
[51] Int. Cl.⁴ ............................................. G06F 15/20
[52] U.S. Cl. .................................... 364/518; 364/519; 340/799; 400/61
[58] Field of Search ....................... 364/519, 523, 518; 400/61, 62; 340/706, 720, 723, 798, 799

[56] References Cited
U.S. PATENT DOCUMENTS

| 4,591,969 | 5/1986 | Bloom et al. | .................. | 364/519 X |
| 4,651,288 | 3/1987 | Zeising | .................. | 364/519 |
| 4,656,602 | 4/1987 | Berkland et al. | ................ | 364/519 X |
| 4,658,366 | 4/1987 | Posh | .................. | 364/523 |

OTHER PUBLICATIONS

American National Standard for Information Systems—Programming Language-COBOL-ANSI X3.23–1985, pp. i thru XIII-79.

Primary Examiner—Gary V. Harkcom
Assistant Examiner—H. R. Herndon
Attorney, Agent, or Firm—Foley & Lardner, Schwartz, Jeffery, Schwaab, Mack, Blumenthal & Evans

[57] ABSTRACT

A data output control system which comprises a first storage unit for storing data to be printed, an output unit for printing the data on an output medium, and a second storage unit for sotring a program. A third storage unit is provided for storing position information indicative of a line position and a column position on the printing medium from which the printing of the data is to be started. The system further comprises a first output control unit for renewing the position information in the third storage unit on the basis of first information of the program and printing the data, specified by a data output instruction of the program, on the printing medium from the line and column position specified by the position information in the third storage unit. A second output control unit is provided for renewing the position information in the third storage unit on the basis of second information of the program after printing the data specified by a data output instruction of the program, on the printing medium from the line and column position specified by the position information in the third storage unit.

2 Claims, 9 Drawing Sheets

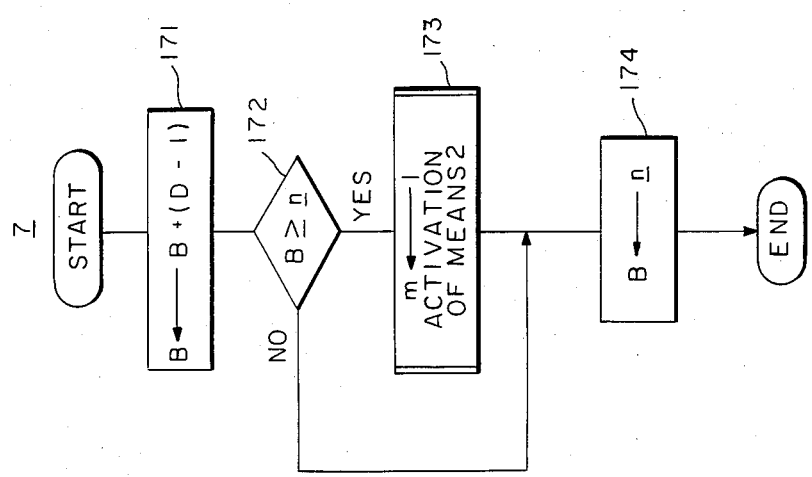
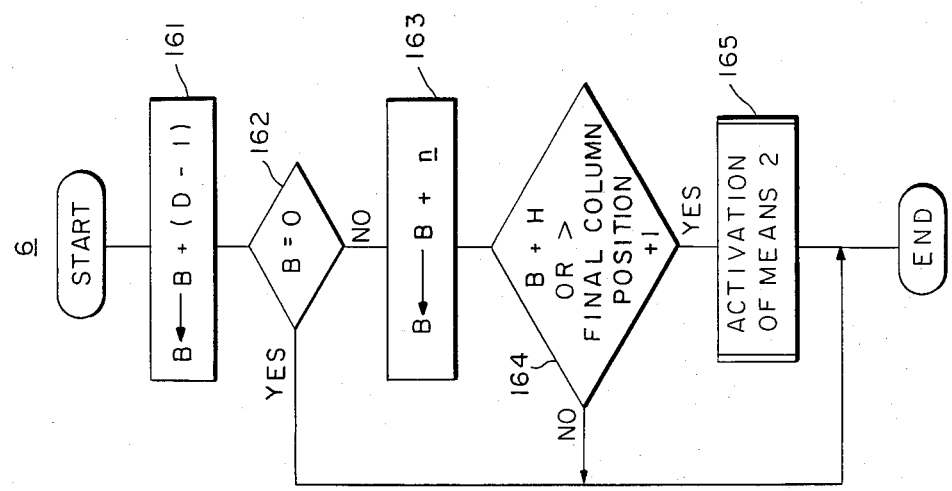
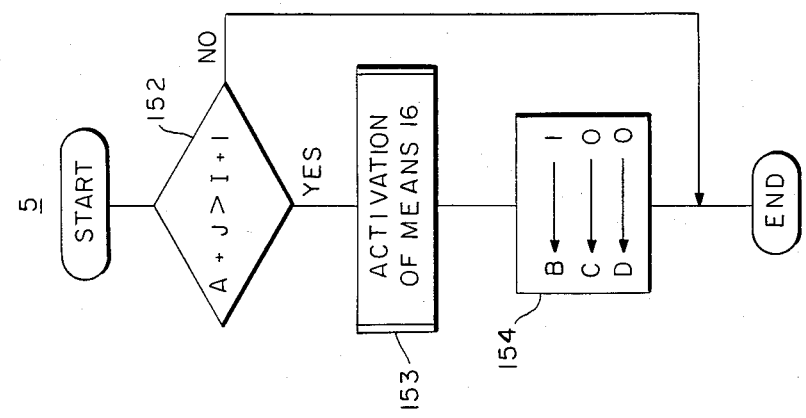

DATA OUTPUT CONTROL SYSTEM

BACKGROUND OF THE INVENTION

Conventionally, entries into books and slips at banks and elsewhere are done with a computer according to a program written in the COBOL language (see, for instance, "Programming Language COBOL" published in September 1985 by American National Standard Inc.). However, in a print control system including a printer unit controlled by a print control statement defined in the COBOL language, a print line position can be specified, whereas a print column position cannot be specified. For this reason, a program for preparing a complex book or document inevitably has to be complicated in structure and, moreover, the preparation of such a book or document takes a long period of time.

SUMMARY OF THE INVENTION

An object of the present invention is, therefore, to provide a data output control system which is free from the above-mentioned disadvantage in the prior art.

According to an aspect of the invention, there is provided a system which comprises first storage means for storing data to be printed; output means for printing said data on an output medium; second storage means for storing a program including a first output-starting-position-specifying (OSPS) instruction having first output-line-specifying (OLS) information, first output-column-specifying (OCS) information and first output-mode information, a second OSPS instruction having second OLS information, second OCS information and second output-mode information a data output instruction, and third storage means for storing position information indicative of a line position and a column position on said printing medium from which the printing of said data is to be started.

The system further comprises first output control means for renewing the position information in the third storage means on the basis of the first OLS information and the first OCS information, and printing the data, specified by the data output instruction appearing in the program following the first OSPS instruction, on the printing medium from the line position and column position specified by the position information in the third storage means; and second output control means for renewing the position information in the third storage means on the basis of the second OLS information and the second OCS information after printing the data, specified by the data output instruction appearing in the program following the second OSPS instruction, on the printing medium from the line position and column position specified by the position information in the third storage means.

BRIEF DESCRIPTION OF THE DRAWINGS

Other features and advantages of the invention will become more apparent from the following detailed description when taken in conjunction with the accompanying drawings in which:

FIGS. 2 to 16 show flow charts for describing respective processings in main structural elements employed in the embodiment of FIG. 1.

DETAILED DESCRIPTION OF THE PREFERRED EMBODIMENTS

A system based on the present invention is applicable to various programming languages and can process the following two output-starting-position-specifying (OSPS) instructions described in user's application program (AP), i.e., a BEFORE instruction and an AFTER instruction.

The BEFORE and AFTER instructions are respectively described in the following formats:

BEFORE<+/m: [+]n> and

AFTER<+/m : [+]n> where is the number of lines to be fed as new lines and D is the number of columns to be newly fed. If + is specified before and in each of the instructions, it means that a relative-line-feed and a relative-columns-feed, respectively; if a symbol / is specified before m, it means that a page-feed; and if nothing is specified before m and n, it means an absolute-line-feed and an absolute-column-feed, respectively. Thus, the BEFORE instruction is a command to advance the printing position by m lines and n columns before printing from the advanced printing position print data specified by a data output instruction appearing in the AP following the BEFORE instruction, while the AFTER instruction is one to advance the printing position by m lines and n columns after printing print data specified by a data output instruction appearing in the AP following the AFTER instruction.

Figure 1:
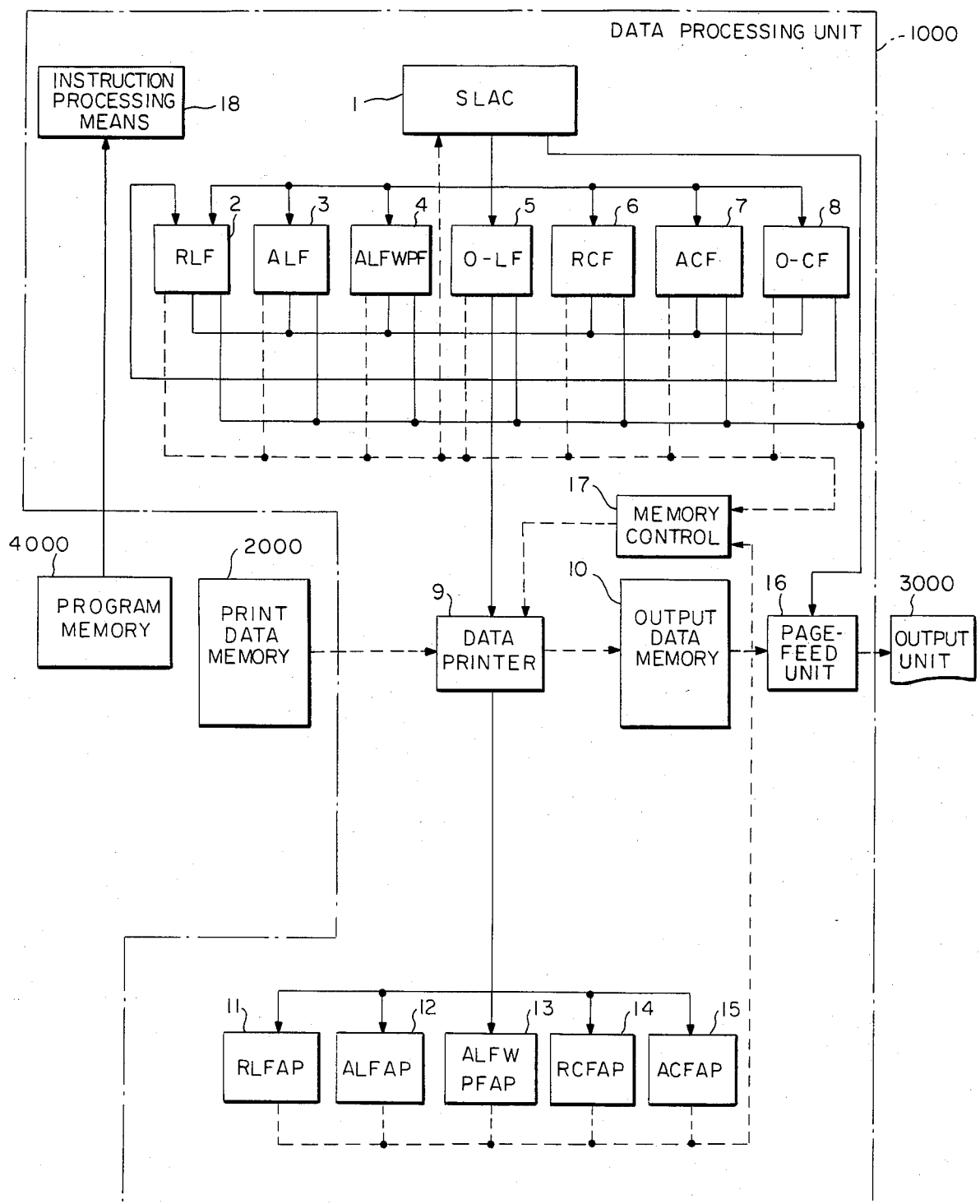
FIG. 1 is a block diagram of an embodiment of the invention.

Referring to FIG. 1, an embodiment of the invention comprises data processing means 1000 such as a well-known general purpose computer; program memory 4000 composed of a main memory unit in which is stored an AP including the above-mentioned OSPS instructions and data output instructions; print data memory 2000 composed of a large capacity auxiliary memory unit, in which are stored various print data in file form, among other things; and output unit 3000 consisting of a printer unit for printing data fed from the processing unit 1000. The processing unit 1000 further comprises save-line-and-column (SLAC) processing unit 1; relative-line-feed (RLF) unit 2; absolute-line-feed (ALF) unit 3, absolute-line-feed-with-page-feed (ALFWPF) unit 4; O-line-feed (O-LF) unit 5; relative-column-feed (RCF) unit 6; absolute-column-feed (ACF) unit 7; O-column-feed (O-CF) unit 8; data printer 9; output data memory 10; relative-line-feed-after-printing (FLFAP) unit 11; absolute-line-feed-after-printing (ALFAP) unit 12; absolute-line-feed-with-page-feed-after-printing (ALFWPFAP) unit 13; relative-column-feed-after-printing (RCFAP) unit 14; absolute-column-feed-after-printing (ACFAP) unit 15; page-feed unit 16; output data memory control 17; and instruction processing unit 18. In FIG. 1, the solid lines represent the flows of control, and dotted lines represent those of data. The AP is supposed to be a product of translation of a source program, written in a high level programming language, into an object program in a machine language by a compiler program.

The output unit 3000 functions to print data supplied from the unit 16 on printing media such as those taking a continuous form. The continuous form consists of paper with continuous pages having perforations formed therebetween so that the pages can be easily separated from each other. In the embodiment, data is printed in a block unit on each page.

Figure 16:
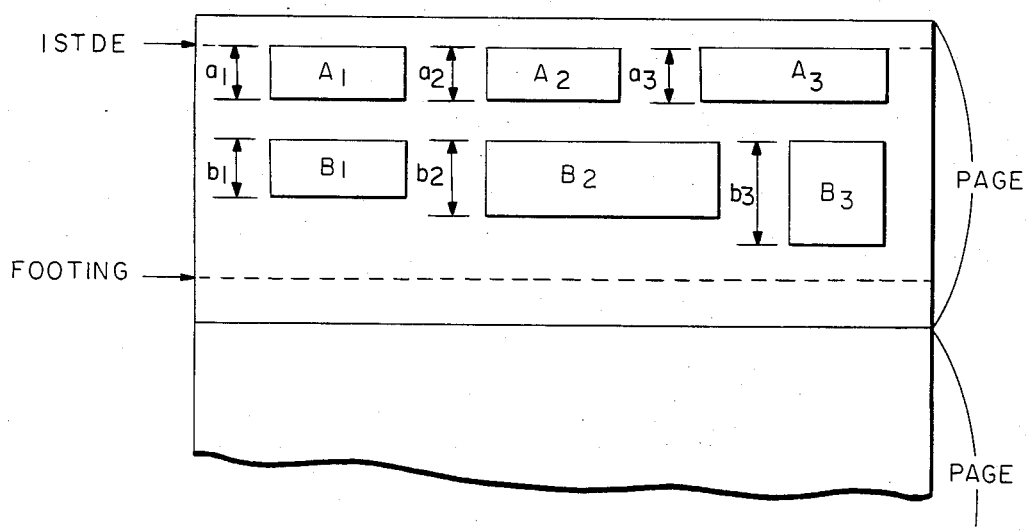

FIG. 16 shows a page on which six blocks A1, A2, A3, B1, B2 and B3 are defined and filled with data (not shown) printed by the output unit 3000.

Next, the means 1 to 17 of the processing unit 1000 will be described in detail.

The output data memory control 17 includes a line counter A, a column counter B, a maximum line counter C, a maximum column counter D, a preservation line counter E indicative of a line position of the next page for resuming the printing or indicative of a line position for performing the next printing, a preservation column counter F indicative of a column position on the next line for resuming the printing or indicative of a column position for performing the next printing, a switch counter G indicating whether the immediately preceding OSPS instruction has been an AFTER$<+m:n>$ instruction, a ISTDE counter H, and a FOOTING counter I. The counter A indicates a line position (starting-line position) for starting the printing. The counter B indicates a column position (starting-column position) for starting the printing. The counter C indicates the number of lines of the block having the number of lines equal to or larger than those of the other blocks which have the same line position or positions to be printed. For instance, in the case of the upper blocks A1, A2 and A3 shown in FIG. 16, the counter C indicates the number ($a_1=a_2=a_3$) of the lines of the blocks A1, A2, and A3. In the lower blocks B1 B2 and B3, the counter C indicates the number ($b_3$) of the lines of the block B3 greater than those ($b_1$ and $b_2$) of the blocks B1 and B2. The counter D indicates the number of the columns of the block having the rightmost column position in blocks which have the same line position or positions to be printed. For example, the counter D indicates the number of the columns of the block A# in the case of the upper blocks and that of the block B3 in the case of the lower blocks. The counter H indicates the first line position for initially enabling the printing on each page of paper. The counter I indicates the last line position for finally enabling the printing. The contents of the counters H and I are set in advance depending on the size of paper to be printed. The contents of the counters A to G are initialized to "0" in advanced before the execution of the AP.

Figure 2:
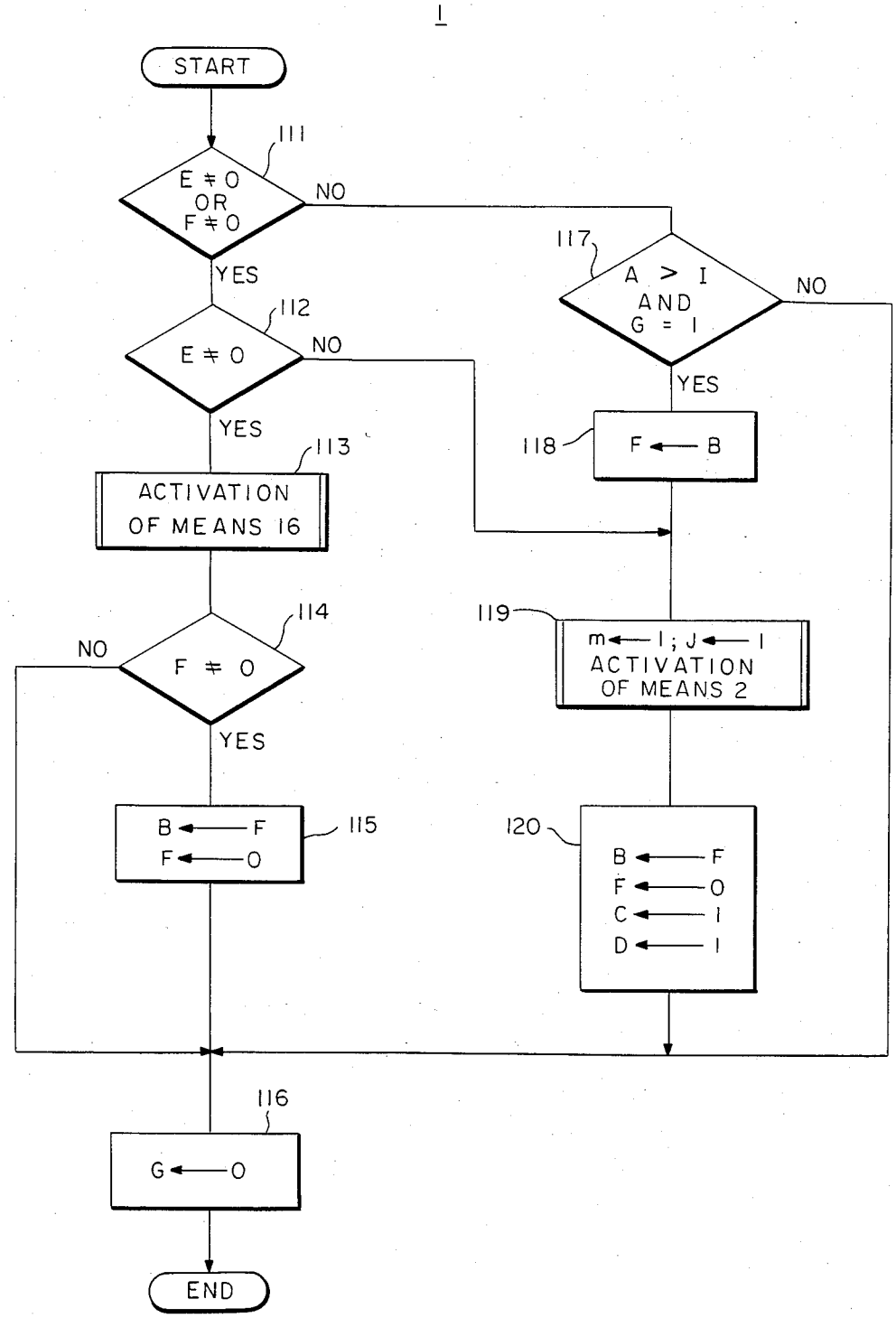

Now referring to FIG. 2, the processing in the SLAC processing unit 1 will be described.

First, at Step 111, the contents of the preservation line counter E and the preservation column counter F are checked, and if the contents of both counters are "0", the sequence moves to Step 117 or, in any other case, it goes to Step 112. If the OSPS instruction immediately preceding the currently processed OSPS instruction is an AFTER$<+m:n>$ instruction, at least one of the counters E and F is not at "0" as will be explained later on, or if it is a BEFORE instruction, both counters are at "0". At Step 112, the content of the counter E is checked, and the sequence moves to Step 119 if it is "0", or to Step 113 if it is not "0". At Step 113 the page-feed unit 16 is operated, which will be described later on, and the sequence goes to Step 114 after the completion of the processing at the page-feed unit 16. At Step 114 the content of the counter F is checked, and the sequence moves to Step 115 if it is not "0" or to Step 116 if it is "0". From Step 117, the sequence goes to Step 118 if the value of the counter I is less than that of the line counter A and that of the counter G is "1" or to the processing of Step 116 in any other case. The counter G, when the immediately preceding OSPS instruction is an AFTER$<+m:n>$instruction, is set to "1" by this instruction. At Step 118, the content of the counter B is set in the counter F. At Step 119, after "1" is selected for m and "1" is set in the counter J, the RLF unit 2 is operated, and the sequence moves to Step 120 after the processing in the RLF unit 2. At Step 120, the content of the counter B is set in the counter F, "0" in the counter F, "1" in the counter C, and "1" in the counter D. The sequence then goes to Step 116, where "0" is set in the counter G to complete the whole processing in the SLAC processing unit.

Figure 3:
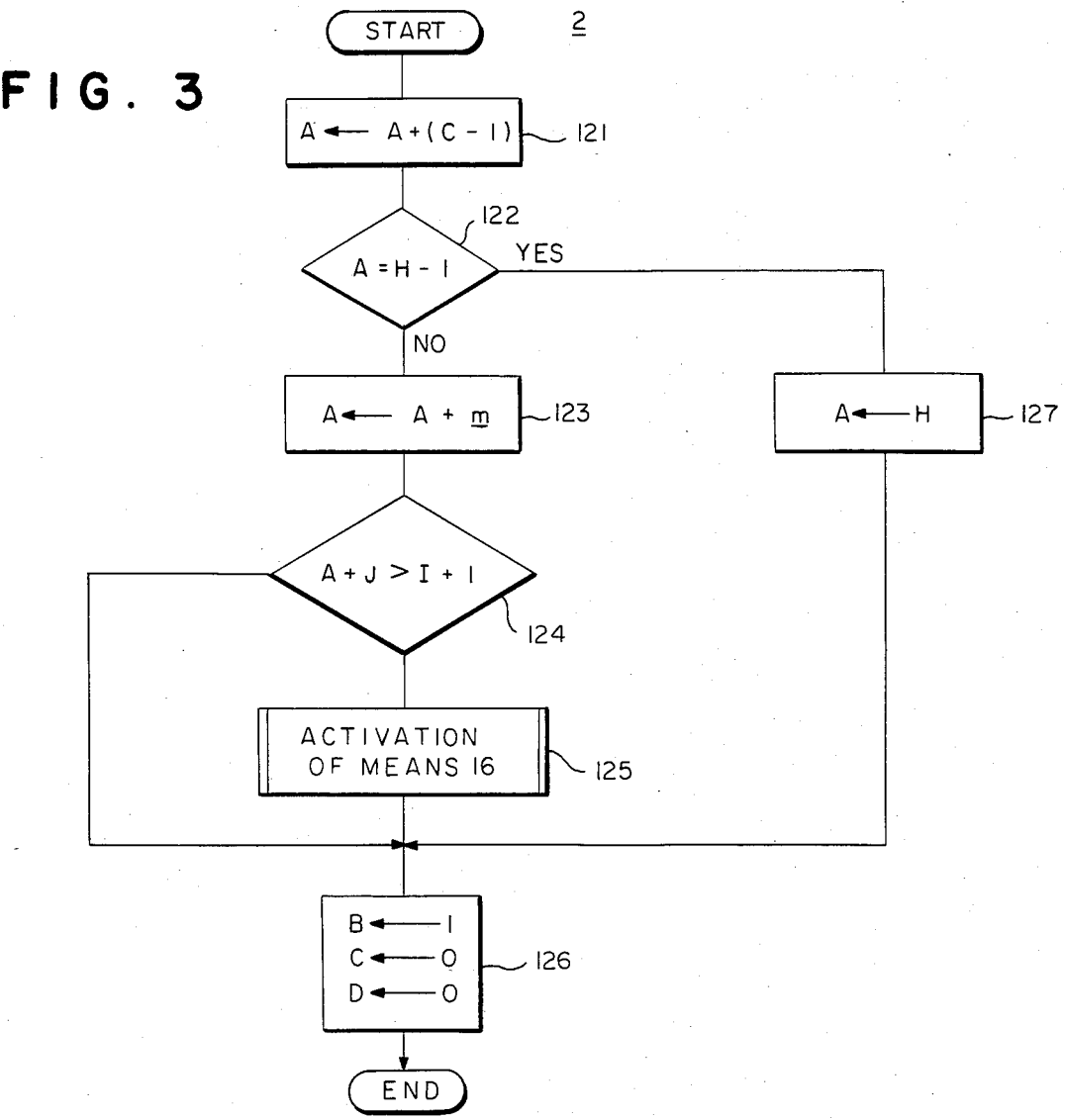

Next, referring to FIG. 3, the processing in the RLF unit 2 will be described.

First, at Step 121, the remainder of subtracting "1" from the value of the counter C is added to the value of the counter A. After that, at Step 122 the value of the counter A and the value of the remainder of subtracting "1" from the value of the counter H are compared and, the sequence moves to Step 127 if the two values are equal or to Step 123 if they are not. From Step 127, after the value of the counter H is set in the counter A, the sequence goes to Step 126. At Step 123, m is added to the value of the counter A. At Step 124, the sum of the value of the counter A and the value of the counter J is compared with the sum of the value of the counter I and "1", and the sequence moves to Step 125 if the former is greater. The value of the counter J, which is supplied by the compiler program at the time of compiling the AP, indicates the number of lines required for the printing of data supplied in response to a data input instruction appearing after the OSPS instruction currently being processed. At Step 125 the page-feed unit 16 is operated, and the sequence goes to Step 126 after the processing in the page-feed unit 16. At Step 126, "1" is set in the counter B, "0" in the counter C and "0" in the counter D to complete the processing in the RLS unit 2.

Thus the RLF unit 2 is so renewed the content of the counter A as to specify a starting-line position m lines ahead of the starting-line position indicated by the value held in the counter A before the processing in the unit 2 (Step 123). If, at this time, the line position indicated by the renewed content of the counter A is beyond the abovementioned maximum line position, the page-feed unit 16 is activated (Step 125).

Next will be described the processing in the ALF unit 3.

Figure 4:
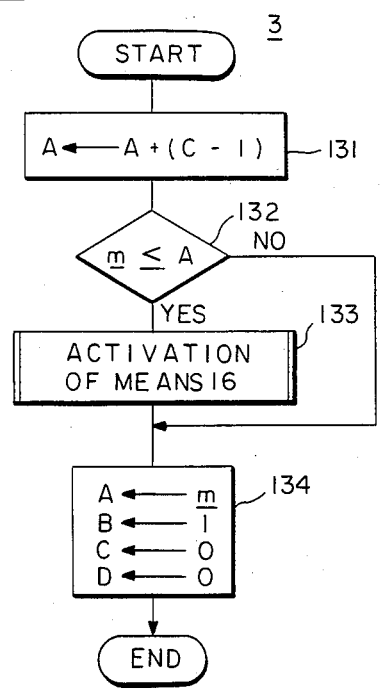

Referring to FIG. 4, at Step 13?, the value of the counter C reduced by "1" is added to the value of the counter A (indicating the starting-line position set by the immediately preceding OSPS instruction). At Step 132 m and the value of the counter A are compared, and the sequence moves to Step 133 if m is no grater than the value of the counter A, or to Step 134 in any other case. At Step 133 the page-feed means 16 is activated in order to prevent the data printed by a data output instruction following the OSPS instruction currently being processed and the data printed by another data output instruction subsequent to the currently processed OSPS instruction from being printed overlapping each other on the same lines. After the processing in the page-feed unit 16, the sequence goes to Step 134, where m is set in the counter A, "1" in the counter B, "0" in the counter C and "0" in the counter D to complete the processing in the ALF unit 3.

Figure 5:
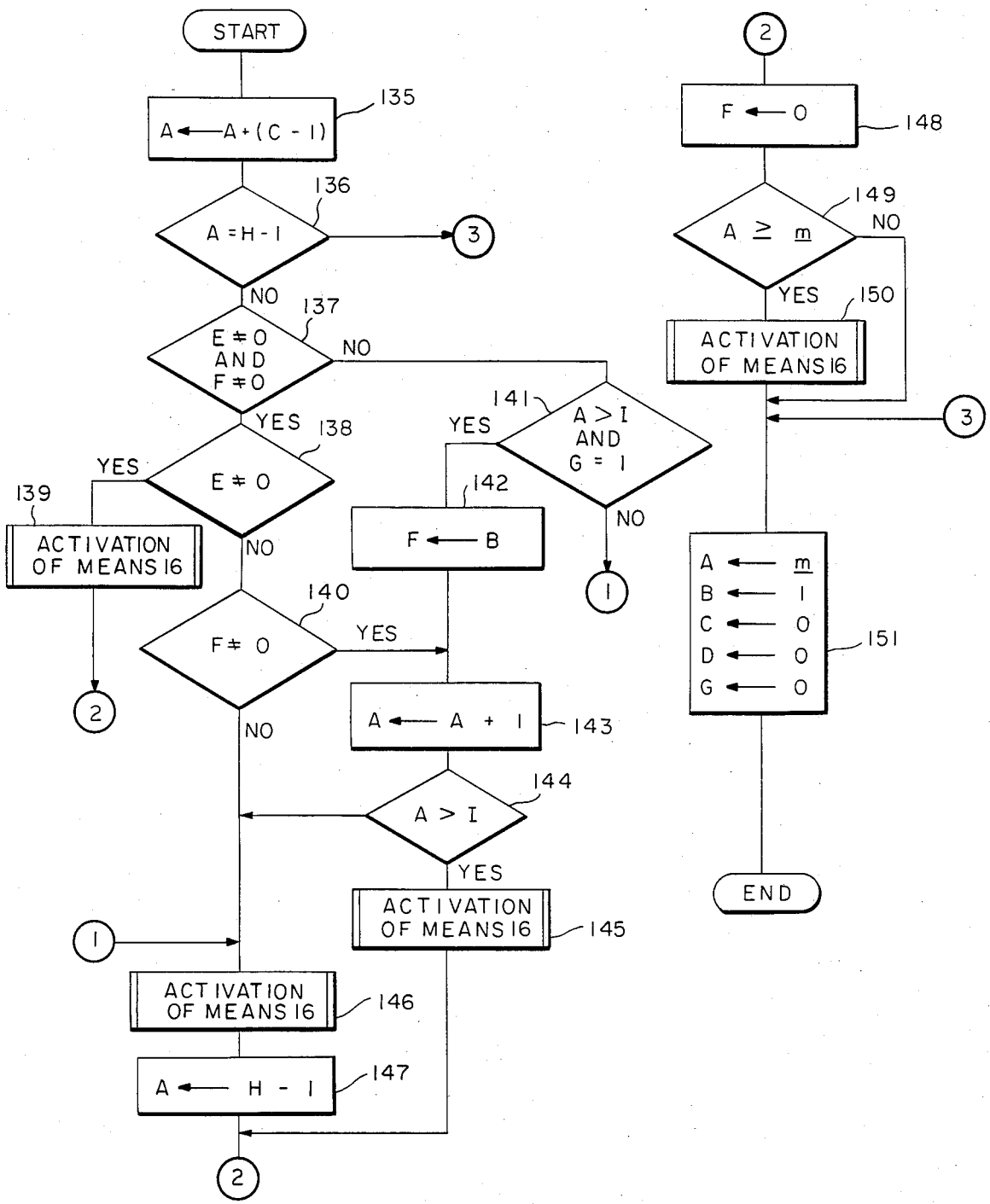

Now referring to FIG. 5, the processing in the ALFWPF unit 4.

First, at Step 135, the value of the counter C reduced by "1" is added to the value of the counter A. After that, at Step 136 the value of the counter A and the value of the counter H reduced by "1" are compared, and the sequence goes to Step 151 if the two values are equal or to Step 137 if they are not. At Step 137 the contents of the counters E and F are checked, and the sequence moves to Step 141 if both are "0" or to Step 138 in any other case. At Step 138 the content of the counter E is checked, and the sequence moves to step 139 if it is not "0" or to Step 140 if it is "0". At Step 140, the content of the counter F is checked, and the sequence moves to Step 143 if it is not "0" or to Step 146 if it is "0". At Step 146 the page-feed unit 16 is activated, and after the processing here, the sequence moves to Step 147, where the value of the counter H reduced by "1" is set in the counter A and the sequence goes to Step 148. At Step 148 "0" is set in the counter F, and the sequence moves to Step 149, where the value of the counter A and m are compared, and the sequence goes to Step 150 if the value of the counter A is not smaller than m or to Step 151 in any other case. At Step 150 the page-feed unit 16 is activated, and the sequence goes to Step 151. From Step 141, the sequence moves to Step 142 if the value of the counter I is smaller than that of the counter A and the counter G is at "1" or to Step 146 in any other case. At Step 142 the value of the counter B is set in the counter F. At Step 143 "1" is added to the value of the counter A. After that, at Step 144, the values of the counters A and I are compared, and the sequence goes to Step 145 if the value of the counter I is smaller than that of the counter A or to Step 146 in any other case. At Steps 145 and 139 is activated the page-feed unit 16, and after the processing here, the sequence moves to Step 148. At Step 151, m is set in the counter A, "1" in the counter B, "0" in the counter C, "0" in the counter D, and "0" in the counter D, and "0" in the counter G to complete the processing in the ALFWPF unit 4.

Now will be described the processing in the OLF unit 5 with reference to FIG. 6.

From Step 152 for checking whether or not the data to be printed next can be accommodated within the current page, the sequence moves to Step 153 if the value of the counter I added by "1" is smaller than that of the counter A added by the value of the counter J, which is related to the currently processed OSPS instruction, whereas the processing in the O-LF unit 5 is completed in any other case. At Step 153 the page-feed unit 16 is activated and after the processing here, the sequence goes to Step 154, where "1" is set in the counter b, "0" in the counter C and "0" in the counter D.

Further will be described the processing in the RCF unit 6 with reference to FIG. 7.

First, at Step 161, the value of the counter D reduced by "1" is added to the value of the counter B (indicating the starting column position set by the immediately preceding OSPS instruction). Then at Step 162 the content of the counter B is checked, and the sequence moves to Step 163 if it is not "0", whereas the processing in the RCF unit 6 is completed if it is. At Step 163 n is added to the value of the counter B. Then from Step 164, the sequence goes to Step 165 if the value of a final column position (the maximum column position for finally enabling the printing on each page specified in the AP) added by "1" is smaller than the sum of the value of the counter B and the value of a HOR (the maximum number of columns in a line required for the printing of data to be printed by a data output instruction following the currently processed OSPS instruction), whereas the processing in the RCF means 6 is completed in any other case. At Step 165, the RLF means 2 is activated after setting "1" for m and, after the processing in the means 2, the processing in the RCF means 6 is completed.

Next will be described the processing in the ACT unit 7 with reference to FIG. 8.

First, at Step 172, the value of the counter D reduced by "1" is added to the value of the counter B. Then from Step 172, the sequence goes to Step 173 if the value of the counter B is not smaller than n or to Step 174 in any other case. At Step 173 the RLF unit 2 is activated after setting "1" for m, and after the processing in the means 2, the sequence moves to Step 174, where n is set in the counter B to complete the processing in the ACF means 7.

Figure 9:
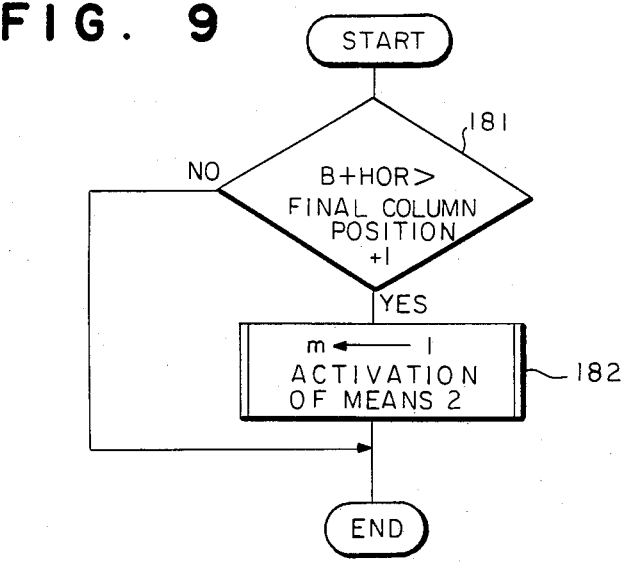

Now will be described the processing in the O-CF unit 8 with reference to FIG. 9.

First, from Step 181, the sequence moves to Step 182 if the value of the aforementioned final column position added by "1" is smaller than the value of the column counter B added by the value of the HOR, whereas the processing the O-CF unit 8 is completed in any other case. At Step 182 the RLF unit 2 is activated after setting "1" for m.

Figure 10:
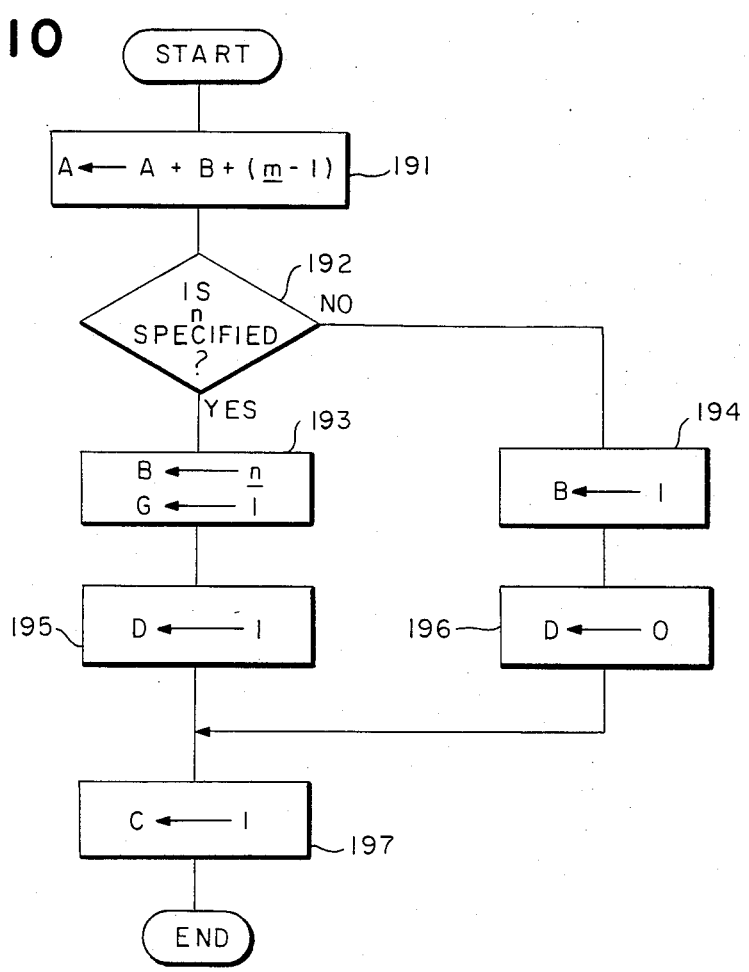

Next will be described the processing in the RLFAP unit 11 with reference to FIG. 10.

First, the value of the counter B and (m-1) are added to that of the counter A. Next, at Step 192 a check is made as to whether or not n is specified in the currently processed instruction, and the sequence goes to Step 193 if it is or to Step 194 if it is not. At Step 193 n is set in the counter B, and "1" in the counter G. At Step 195 "1" is set in the counter D, and the sequence moves to Step 197. At Step 194 "1" is set in the counter B, and at Step 196 is set "0" in the counter D. At Step 197 "1" is set in the counter C to complete the processing in the RLFAP unit 11.

Figure 11:
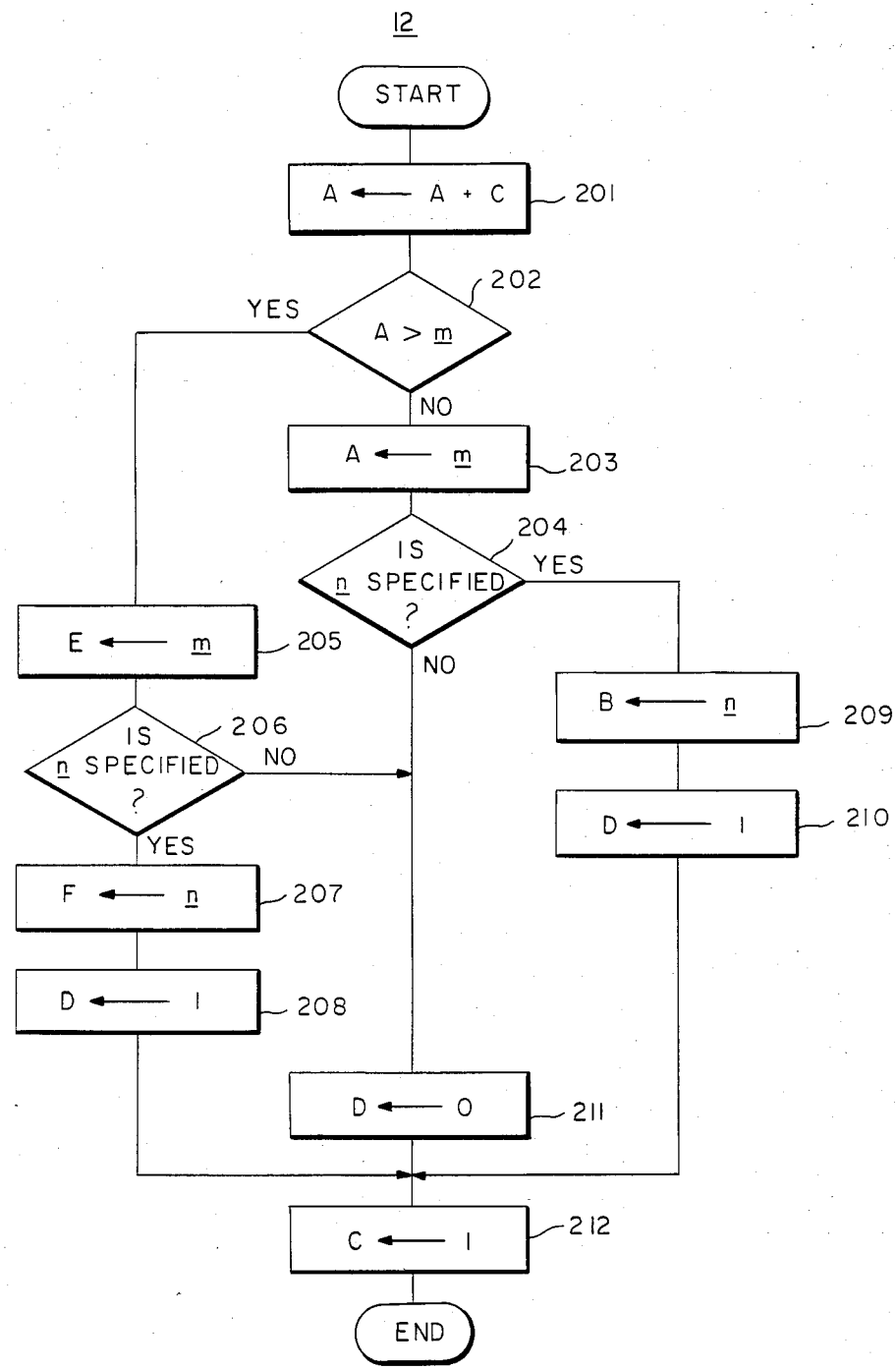
Figure 12:
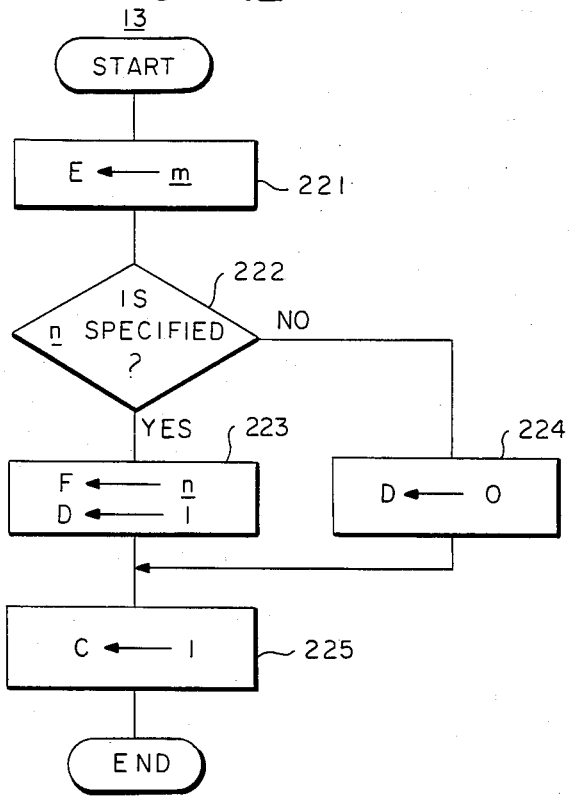

Next will be described the processing in the ALFAP unit 12 with reference to FIG. 11.

First, at Step 201, the value of the counter C is added to that of the counter A. Then, from Step 202, the sequence goes to Step 205 if m is smaller than the value of the counter A or to Step 203 in any other case. From Step 203, the sequence moves to Step 204 after setting m in the counter A. At Step 204 a check whether or not D is specified in the currently processed instruction is made, and the sequence goes to Step 209 if it is or to Step 211 if it is not. At Step 211 "0" is set in the counter D, and the sequence moves to Step 212. At Step 205 m is set in the counter E, and the sequence goes to Step 206, where it is checked whether or not is specified in the currently processed instruction, and the sequence goes to Step 207 if it is or to Step 211 if it is not. At Step 207 n is set in the counter F, and the sequence goes to Step 208, where "1" is set in the counter D, and the sequences moves to Step 212. At Step 209 D is set in the counter B and the sequence goes to Step 210, where "1" is set in the counter D, and the sequence moves to Step 212. At Step 212, "1" is set in the counter C to complete the processing in the ALFAP unit 12.

Now will be described the processing in the ALFW-PFAP unit 13 with reference to FIG>12.

First, at Step 221, m is set in the counter E, and the sequence goes to Step 222, where it is checked whether or no n is specified in the currently processed instruction, and the sequence moves to Step 223 if it is or to Step 224 it if is not. At Step 223 n is set in the counter F and "1" in the counter D, and the sequence goes to Step 225. At Step 224 "0" is set in the counter D, and the sequence moves to Step 225, where "1" is set in the counter C to complete the processing in the ALFW-PFAP unit 13.

Figure 13:
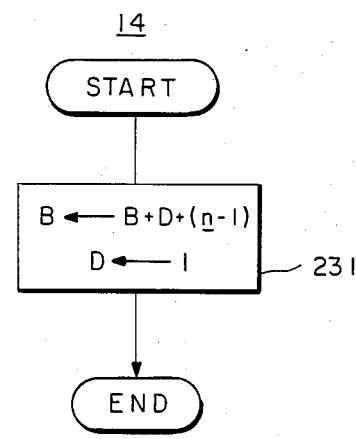

Now is described the RCFAP unit 14 with reference to FIG. 13.

The processing here is only to add the value of the counter D and (n-1) to that of the counter B and set "1" in the counter D at Step 231.

Figure 14:
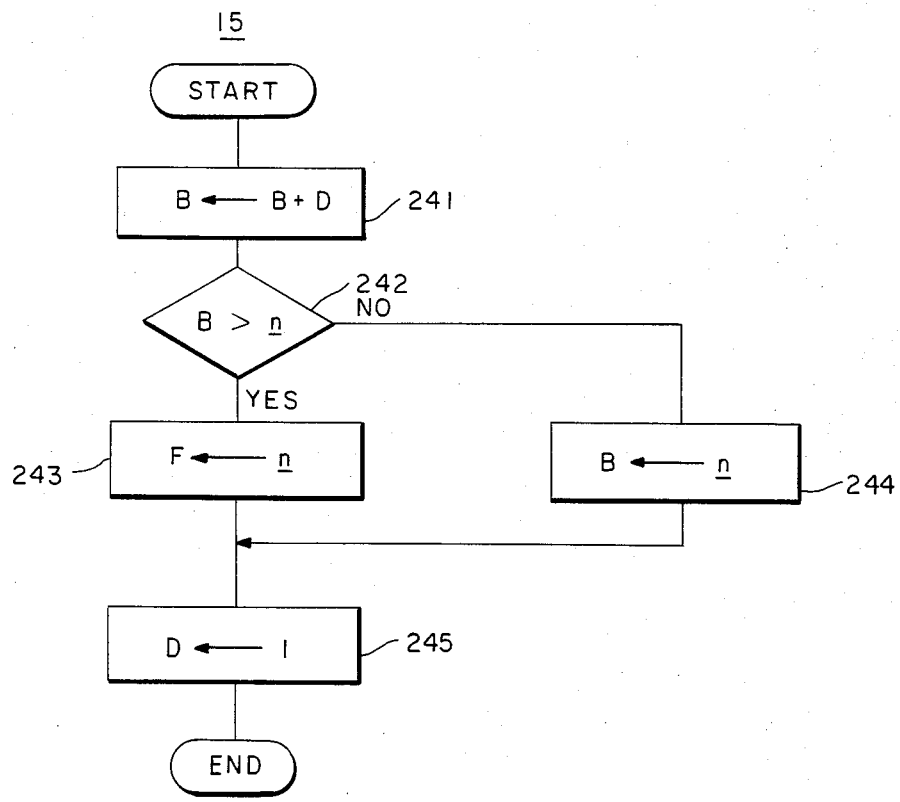

Next will be described the processing in the ACFAP unit 15 with reference to FIG. 14.

First, at Step 241, the value of the counter D is added to that of the counter B, and the sequence moves to the processing of Step 242 and, from there, to Step 243 if n is smaller than the value of the counter B or to Step 244 in any other case. At Step 243 n is set in the counter F, and the sequence goes to Step 245. At Step 244 n is set in the counter B, and the sequence moves to Step 245, where "1" is set in the counter D to complete the processing in the ACFAP unit 15.

Figure 15:
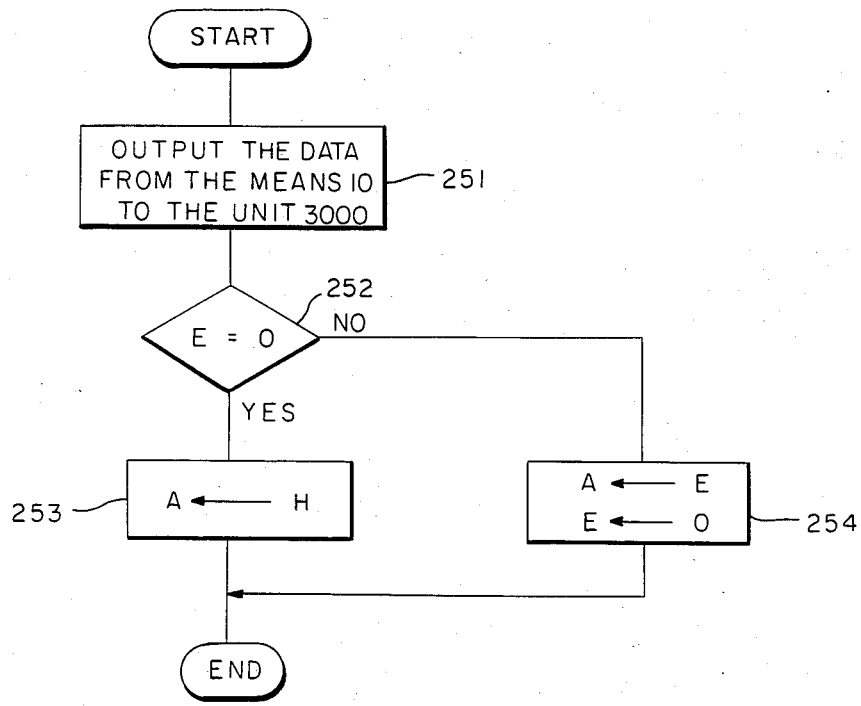

Now will be described the processing in the page-feed unit 16 with reference to FIG. 15.

First, at Step 251, a page of print text data (including print character data and print control codes for specifying positions where the print character data are to be printed and so forth) are read out of the output data memory means 10 to the printer unit 3000. At Step 252 the counter E is checked, and the sequence move to Step 253 if its content is "0" or to Step 254 if it is not. At Step 253 the value of the counter H in the counter A is set. At Step 254 the content of the counter E in the counter A is set, and "0" in the counter E.

Next will be described the instruction processing unit 18, which, intended for processing various instructions of the AP, is composed of software, firmware and hardware, as is well known with usual computers. The unit 18 includes functions to process the following 11 kinds of OSPS instructions. The functions will be described below.

(I) Instruction format: BEFORE<+m:n>
Functions: Relative m-line feed and absolute n-column feed before printing
Processing in the unit 18:
(1) Activating the SLACP unit 1;
(2) Activating the RLF unit 2, resulting in the setting of the line counter A;
(3) Activating the ACF unit 7;
(4) Setting n or "1" (if n is dispensed with) in the column counter B;
(5) Setting the number of lines for printing data in the maximum line counter C; and
(6) Setting the number of columns for printing data in the maximum column counter D.

(II) Instruction format: BEFORE<m: n>
Functions: Absolute m-line feed and absolute n-column feed before printing
Processing in the unit 18:
(1) Activating the SLACP unit 1;
(2) Activating the ALF unit 3, resulting in setting of m in the line counter A;
(3) Activating the ACF unit 7;
(4) Setting n or "1" (if n is dispensed with) in the column counter B;
(5) Setting the number of lines for printing data in the maximum line counter C; and
(6) Setting the number of columns for printing data in the maximum column counter D.

(III) Instruction Format: BEFORE</m:n>
Functions: Absolute m-line feed and absolute n-column feed after feeding a page before printing
Processing in the unit 18:
(1) Activating the ALFWPF unit 4, resulting in setting of m in the line counter A;
(2) Activating the ACF unit 7;
(3) Setting n or "1" (if n is dispensed with) in the column counter B;
(4) Setting the number of lines for printing data in the maximum line counter C; and
(5) Setting the number of columns for printing data in the maximum column counter D.

(IV) Instruction format: BEFORE<+0: +n>
Functions: O-line feed (no line feed) and relative D-column feed before printing
Processing in the unit 18:
(1) Activating the SLAC processing unit 1;
(2) Activating the O-LF unit 5, resulting in the setting of the line counter A;
(3) Activating the RCF unit 6, resulting in the setting of the column counter B;
(4) Setting the greater one of the number indicated by the maximum line counter C and the number of lines for printing data in the maximum line counter C; and
(5) Setting the number of columns for printing data in the maximum column counter D.

(V) Instruction format: BEFORE<+0:n>
Functions: O-line feed and absolute n-column feed before printing
Processing in the unit 18:
(1) Activating the SLAC processing unit 1;
(2) Activating the O-LF unit 5, resulting in the setting of the line counter A;
(3) Activating the ACF unit 7, resulting in the setting of the column counter B; and
(4) Setting the greater one of the number indicated by the maximum line counter C and the number of lines for printing data in the maximum line counter C, and setting the number of columns for printing data in the maximum column counter D.

(VI) Instruction format: BEFORE<+0:+0>
Functions: O-line feed and O-column feed before printing
Processing in the unit 18;
(1) Activating the SLAC processing unit 1;
(2) Activating the O-LF unit 5, resulting in the setting of the line counter A;
(3) Activating the O-CF unit 8, resulting to the setting of the column counter B; and
(4) Setting the greater one of the number indicated by the maximum line counter C and the number of lines for printing data in the maximum line counter C, and setting the greater one of the number indicated by the maximum column counter D and the number of columns for printing data in the maximum column counter D.

(VII) Instruction format: AFTER<+m:n>
Functions: Relative m-line feed and absolute n-column feed after printing
Processing in the unit 18:

Now referring to FIG. 5, the processing in the ALFWPF unit 4.

First, at Step 135, the value of the counter C reduced by "1" is added to the value of the counter A. After that, at Step 136 the value of the counter A and the value of the counter H reduced by "1" are compared, and the sequence goes to Step 151 if the two values are equal or to Step 137 if they are not. At Step 137 the contents of the counters E and F are checked, and the sequence moves to Step 141 if both are "0" or to Step 138 in any other case. At Step 138 the content of the counter E is checked, and the sequence moves to step 139 if it is not "0" or to Step 140 if it is "0". At Step 140, the content of the counter F is checked, and the sequence moves to Step 143 if it is not "0" or to Step 146 if it is "0". At Step 146 the page-feed unit 16 is activated, and after the processing here, the sequence moves to Step 147, where the value of the counter H reduced by "1" is set in the counter A and the sequence goes to Step 148. At Step 148 "0" is set in the counter F, and the sequence moves to Step 149, where the value of the counter A and m are compared, and the sequence goes to Step 150 if the value of the counter A is not smaller than m or to Step 151 in any other case. At Step 150 the page-feed unit 16 is activated, and the sequence goes to Step 151. From Step 141, the sequence moves to Step 142 if the value of the counter I is smaller than that of the counter A and the counter G is at "1" or to Step 146 in any other case. At Step 142 the value of the counter B is set in the counter F. At Step 143 "1" is added to the value of the counter A. After that, at Step 144, the values of the counters A and I are compared, and the sequence goes to Step 145 if the value of the counter I is smaller than that of the counter A or to Step 146 in any other case. At Steps 145 and 139 is activated the page-feed unit 16, and after the processing here, the sequence moves to Step 148. At Step 151, m is set in the counter A, "1" in the counter B, "0" in the counter C, "0" in the counter D, and "0" in the counter D, and "0" in the counter G to complete the processing in the ALFWPF unit 4.

Now will be described the processing in the OLF unit 5 with reference to FIG. 6.

From Step 152 for checking whether or not the data to be printed next can be accommodated within the current page, the sequence moves to Step 153 if the value of the counter I added by "1" is smaller than that of the counter A added by the value of the counter J, which is related to the currently processed OSPS instruction, whereas the processing in the O-LF unit 5 is completed in any other case. At Step 153 the page-feed unit 16 is activated and after the processing here, the sequence goes to Step 154, where "1" is set in the counter b, "0" in the counter C and "0" in the counter D.

Further will be described the processing in the RCF unit 6 with reference to FIG. 7.

First, at Step 161, the value of the counter D reduced by "1" is added to the value of the counter B (indicating the starting column position set by the immediately preceding OSPS instruction). Then at Step 162 the content of the counter B is checked, and the sequence moves to Step 163 if it is not "0", whereas the processing in the RCF unit 6 is completed if it is. At Step 163 n is added to the value of the counter B. Then from Step 164, the sequence goes to Step 165 if the value of a final column position (the maximum column position for finally enabling the printing on each page specified in the AP) added by "1" is smaller than the sum of the value of the counter B and the value of a HOR (the maximum number of columns in a line required for the printing of data to be printed by a data output instruction following the currently processed OSPS instruction), whereas the processing in the RCF means 6 is completed in any other case. At Step 165, the RLF means 2 is activated after setting "1" for m and, after the processing in the means 2, the processing in the RCF means 6 is completed.

Next will be described the processing in the ACT unit 7 with reference to FIG. 8.

First, at Step 172, the value of the counter D reduced by "1" is added to the value of the counter B. Then from Step 172, the sequence goes to Step 173 if the value of the counter B is not smaller than n or to Step 174 in any other case. At Step 173 the RLF unit 2 is activated after setting "1" for m, and after the processing in the means 2, the sequence moves to Step 174, where n is set in the counter B to complete the processing in the ACF means 7.

Now will be described the processing in the O-CF unit 8 with reference to FIG. 9.

First, from Step 181, the sequence moves to Step 182 if the value of the aforementioned final column position added by "1" is smaller than the value of the column counter B added by the value of the HOR, whereas the processing the O-CF unit 8 is completed in any other case. At Step 182 the RLF unit 2 is activated after setting "1" for m.

Next will be described the processing in the RLFAP unit 11 with reference to FIG. 10.

First, the value of the counter B and (m-1) are added to that of the counter A. Next, at Step 192 a check is made as to whether or not n is specified in the currently processed instruction, and the sequence goes to Step 193 if it is or to Step 194 if it is not. At Step 193 n is set in the counter B, and "1" in the counter G. At Step 195 "1" is set in the counter D, and the sequence moves to Step 197. At Step 194 "1" is set in the counter B, and at Step 196 is set "0" in the counter D. At Step 197 "1" is set in the counter C to complete the processing in the RLFAP unit 11.

Next will be described the processing in the ALFAP unit 12 with reference to FIG. 11.

First, at Step 201, the value of the counter C is added to that of the counter A. Then, from Step 202, the sequence goes to Step 205 if m is smaller than the value of the counter A or to Step 203 in any other case. From Step 203, the sequence moves to Step 204 after setting m in the counter A. At Step 204 a check whether or not D is specified in the currently processed instruction is made, and the sequence goes to Step 209 if it is or to Step 211 if it is not. At Step 211 "0" is set in the counter D, and the sequence moves to Step 212. At Step 205 m is set in the counter E, and the sequence goes to Step 206, where it is checked whether or not is specified in the currently processed instruction, and the sequence goes to Step 207 if it is or to Step 211 if it is not. At Step 207 n is set in the counter F, and the sequence goes to Step 208, where "1" is set in the counter D, and the sequences moves to Step 212. At Step 209 D is set in the counter B and the sequence goes to Step 210, where "1" is set in the counter D, and the sequence moves to Step 212. At Step 212, "1" is set in the counter C to complete the processing in the ALFAP unit 12.

Now will be described the processing in the ALFW-PFAP unit 13 with reference to FIG>12.

First, at Step 221, m is set in the counter E, and the sequence goes to Step 222, where it is checked whether or no n is specified in the currently processed instruction, and the sequence moves to Step 223 if it is or to Step 224 it if is not. At Step 223 n is set in the counter F and "1" in the counter D, and the sequence goes to Step 225. At Step 224 "0" is set in the counter D, and the sequence moves to Step 225, where "1" is set in the counter C to complete the processing in the ALFW-PFAP unit 13.

Now is described the RCFAP unit 14 with reference to FIG. 13.

The processing here is only to add the value of the counter D and (n-1) to that of the counter B and set "1" in the counter D at Step 231.

Next will be described the processing in the ACFAP unit 15 with reference to FIG. 14.

First, at Step 241, the value of the counter D is added to that of the counter B, and the sequence moves to the processing of Step 242 and, from there, to Step 243 if n is smaller than the value of the counter B or to Step 244 in any other case. At Step 243 n is set in the counter F, and the sequence goes to Step 245. At Step 244 n is set in the counter B, and the sequence moves to Step 245, where "1" is set in the counter D to complete the processing in the ACFAP unit 15.

Now will be described the processing in the page-feed unit 16 with reference to FIG. 15.

First, at Step 251, a page of print text data (including print character data and print control codes for specifying positions where the print character data are to be printed and so forth) are read out of the output data memory means 10 to the printer unit 3000. At Step 252 the counter E is checked, and the sequence move to Step 253 if its content is "0" or to Step 254 if it is not. At Step 253 the value of the counter H in the counter A is set. At Step 254 the content of the counter E in the counter A is set, and "0" in the counter E.

Next will be described the instruction processing unit 18, which, intended for processing various instructions of the AP, is composed of software, firmware and hardware, as is well known with usual computers. The unit 18 includes functions to process the following 11 kinds of OSPS instructions. The functions will be described below.

(I) Instruction format: BEFORE<+m:n>
  Functions: Relative m-line feed and absolute n-column feed before printing
  Processing in the unit 18:
    (1) Activating the SLACP unit 1;
    (2) Activating the RLF unit 2, resulting in the setting of the line counter A;
    (3) Activating the ACF unit 7;
    (4) Setting n or "1" (if n is dispensed with) in the column counter B;
    (5) Setting the number of lines for printing data in the maximum line counter C; and
    (6) Setting the number of columns for printing data in the maximum column counter D.

(II) Instruction format: BEFORE<m: n>
  Functions: Absolute m-line feed and absolute n-column feed before printing
  Processing in the unit 18:
    (1) Activating the SLACP unit 1;
    (2) Activating the ALF unit 3, resulting in setting of m in the line counter A;
    (3) Activating the ACF unit 7;
    (4) Setting n or "1" (if n is dispensed with) in the column counter B;
    (5) Setting the number of lines for printing data in the maximum line counter C; and
    (6) Setting the number of columns for printing data in the maximum column counter D.

(III) Instruction Format: BEFORE</m:n>
  Functions: Absolute m-line feed and absolute n-column feed after feeding a page before printing
  Processing in the unit 18:
    (1) Activating the ALFWPF unit 4, resulting in setting of m in the line counter A;
    (2) Activating the ACF unit 7;
    (3) Setting n or "1" (if n is dispensed with) in the column counter B;
    (4) Setting the number of lines for printing data in the maximum line counter C; and
    (5) Setting the number of columns for printing data in the maximum column counter D.

(IV) Instruction format: BEFORE<+0: +n>
  Functions: O-line feed (no line feed) and relative D-column feed before printing
  Processing in the unit 18:
    (1) Activating the SLAC processing unit 1;
    (2) Activating the O-LF unit 5, resulting in the setting of the line counter A;
    (3) Activating the RCF unit 6, resulting in the setting of the column counter B;
    (4) Setting the greater one of the number indicated by the maximum line counter C and the number of lines for printing data in the maximum line counter C; and
    (5) Setting the number of columns for printing data in the maximum column counter D.

(V) Instruction format: BEFORE<+0:n>
  Functions: O-line feed and absolute n-column feed before printing
  Processing in the unit 18:
    (1) Activating the SLAC processing unit 1;
    (2) Activating the O-LF unit 5, resulting in the setting of the line counter A;
    (3) Activating the ACF unit 7, resulting in the setting of the column counter B; and
    (4) Setting the greater one of the number indicated by the maximum line counter C and the number of lines for printing data in the maximum line counter C, and setting the number of columns for printing data in the maximum column counter D.

(VI) Instruction format: BEFORE<+0:+0>
  Functions: O-line feed and O-column feed before printing
  Processing in the unit 18;
    (1) Activating the SLAC processing unit 1;
    (2) Activating the O-LF unit 5, resulting in the setting of the line counter A;
    (3) Activating the O-CF unit 8, resulting to the setting of the column counter B; and
    (4) Setting the greater one of the number indicated by the maximum line counter C and the number of lines for printing data in the maximum line counter C, and setting the greater one of the number indicated by the maximum column counter D and the number of columns for printing data in the maximum column counter D.

(VII) Instruction format: AFTER<+m:n>
  Functions: Relative m-line feed and absolute n-column feed after printing
  Processing in the unit 18:

(1) Activating the RLFAP unit 7; and
(2) Activating the ACFAP unit 15.

(VIII) Instruction format: AFTER<m:n>
Functions: Absolute m-line feed and absolute n-column feed after printing
Processing in the unit 18:
(1) Activating the ALFAP unit 12; and
(2) Activating the ACFAP unit 15;

(IX) Instruction format: AFTER</m:n>
Functions: Absolute m-line feed and absolute n-column feed after printing and page feed
Processing in the unit 18:
(1) Activating the ALFWPFAP unit 13: and
(2) Activating the ACFAP unit 15;

(X) Instruction format: AFTER<+0:+n>
Functions: O-line feed and relative n-column feed after printing
Processing in the unit 18;
(1) Activating the RCFAP unit 14;

(XI) Instruction format: AFTER<+0:n>
Functions: O-line feed and absolute column feed after printing
Processing in the unit 18:
(1) Activating the ACFAP unit 15.

While this invention has so far been described in conjunction with the preferred embodiment thereof, it will not readily be possible for those skilled in the art to put this invention into practice in various other manners.

What is claimed is:

1. A data output control system comprising:
first storage means for storing data to be printed;
output means for printing said data on an output medium;
second storage means for storing a program including a first output-starting-position-specifying instruction having first output-line-specifying information, first output-column-specifying information and first output-mode information, a second output-starting-position-specifying instruction having second output-line-specifying information, second output-column-specifying information and second output-mode information, and a data output instruction;
third storage means for storing position information indicative of a line position and a column position on said printing medium from which the printing of said data is to be started;
first output control means for renewing said position information in said third storage means on the basis of said first output-line-specifying information and said first output-column-specifying information, and printing said data, specified by said data output instruction appearing in said program following said first output-starting-position-specifying instruction, on said printing medium from the line position and column position specified by said position information in said third storage means; and
second output control means for renewing said position information in said third storage means on the basis of said second output-line-specifying information and said second output-column-specifying information after printing said data, specified by said data output instruction appearing in said program following said second output-starting-position-specifying instruction, on said printing medium from the line position and column position specified by said position information in said third storage means.

2. A data output control system as claimed in claim 1, wherein said output mode information specifies whether said output-line-specifying information and said output-column-specifying information should indicate an absolution position on said printing medium or a relative position from said line position and said column position indicated by said position information in said third storage means.

* * * * *